United States Patent
Armbruster et al.

(10) Patent No.: US 9,360,664 B2
(45) Date of Patent: Jun. 7, 2016

(54) MICROMECHANICAL COMPONENT AND METHOD FOR PRODUCING A MICROMECHANICAL COMPONENT

(71) Applicants: Simon Armbruster, Wannweil (DE); Helmut Grutzeck, Kusterdingen (DE); Frank Schatz, Kornwestheim (DE); Joerg Muchow, Reutlingen (DE); Frederic Njikam Njimonzie, Reutlingen (DE); Johannes Baader, Wannweil (DE); Kerrin Doessel, Stuttgart (DE); Rainer Straub, Ammerbuch (DE)

(72) Inventors: Simon Armbruster, Wannweil (DE); Helmut Grutzeck, Kusterdingen (DE); Frank Schatz, Kornwestheim (DE); Joerg Muchow, Reutlingen (DE); Frederic Njikam Njimonzie, Reutlingen (DE); Johannes Baader, Wannweil (DE); Kerrin Doessel, Stuttgart (DE); Rainer Straub, Ammerbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/471,582

(22) Filed: Aug. 28, 2014

(65) Prior Publication Data

US 2015/0062677 A1   Mar. 5, 2015

(30) Foreign Application Priority Data

Aug. 28, 2013   (DE) .......................... 10 2013 217 111

(51) Int. Cl.
*G02B 26/08* (2006.01)
*G02B 26/10* (2006.01)

(52) U.S. Cl.
CPC .................................. *G02B 26/0858* (2013.01)

(58) Field of Classification Search
CPC ........................... G02B 26/0858; G02B 26/105
USPC ................................. 359/199.4, 200.8, 221.2
See application file for complete search history.

(56) References Cited

U.S. PATENT DOCUMENTS

| | | | |
|---|---|---|---|
| 2009/0180167 A1* | 7/2009 | Tani et al. | 359/198.1 |
| 2010/0079837 A1* | 4/2010 | Akedo et al. | 359/224.1 |
| 2011/0002022 A1* | 1/2011 | Park et al. | 359/198.1 |
| 2013/0070167 A1* | 3/2013 | Tagami et al. | 348/756 |
| 2013/0128328 A1* | 5/2013 | Honda et al. | 359/199.4 |

* cited by examiner

*Primary Examiner* — Frank Font
(74) *Attorney, Agent, or Firm* — Norton Rose Fulbright US LLP (57) ABSTRACT

A micromechanical component and a method for producing a micromechanical component are described. The component has: a frame; a plate spring that is connected to the frame and that has a front side and a rear side facing away from the front side; a mirror element that is situated on the front side of the plate spring and is connected to the front side of the plate spring in such a way that the mirror element is suspended on the frame so as to be capable of displacement; and at least one piezoelectric strip that is connected to the rear side of the plate spring; the plate spring being elastically deformable through the application of an electrical voltage to the at least one piezoelectric strip in order to displace the mirror element.

11 Claims, 13 Drawing Sheets

MICROMECHANICAL COMPONENT AND METHOD FOR PRODUCING A MICROMECHANICAL COMPONENT

FIELD OF THE INVENTION

The present invention relates to a micromechanical component, in particular a micromechanical mirror, and to a method for producing a micromechanical component, in particular a micromechanical mirror.

BACKGROUND INFORMATION

Micromechanical mirrors are suitable for a large number of applications, for example microprojectors or lidar devices.

In United States Published Patent Appln. No. 2011/0002022, a method is described for adapting a resonance frequency of an optical scanner. In this document, an optical scanner is described that has a main substrate body having two cantilevers, a drive device, a mirror segment, and a clamping device. The mirror segment is structured out from the main substrate body and is suspended between the two cantilevers. The mirror segment can be displaced relative to the clamping device by exciting the main substrate body with a resonance frequency. The resonance frequency is adapted through constructive modifications of the main substrate body and/or of the clamping device.

In such optical scanners, the maximum mirror surface of the mirror segment can be limited due to dynamic inherent deformations that result from the increasing moment of inertia of the mirror surface at a high resonance frequency. Standardly, for applications a maximum deformation of the mirror surface on the order of magnitude of 10% of the wavelength of the light that is to be reflected is tolerated.

SUMMARY

The recognition on which the present invention is based is that piezoelectric strips that are connected to a micromechanical plate spring and to which a voltage is applied, in particular an alternating voltage, can cause an elastic deformation of the plate spring. The basic idea of the present invention is to fashion a micromechanical component in such a way that a mirror element can be displaced by the elastic deformation of the plate spring, the mirror element being situated on the front side of the plate spring. In this way, it is possible to rotate even mirror elements having a large reflecting surface, largely without dynamic inherent deformation. For example, the reflecting surface can be 3.5 $mm^2$ or more, while the dynamic inherent deformation of the reflective surface can at the same time be for example less than 10% of wavelengths of visible light, or can be less than 0.1 μm.

In this way, the micromechanical mirror can be driven in a resonant fashion in a very efficient and precise manner. That is, the elastic deformation of the plate spring can be realized through alternating current excitations that take place with a resonance frequency. In this way, significantly greater deformations can be achieved than can be achieved using static effects. The resonance frequencies of the plate spring and the mode spectrum of the modes of oscillation here are a function of the particular realization of the plate spring and of the elements connected thereto.

With the use of piezoelectric strips for the displacement of the functional element, the energy yield can be approximately 90%, because significantly less Joule heating can be produced in comparison with, for example, a magnetic drive. In addition, through the use of the piezoelectric strips a particularly small, and therefore low-cost, design can be realized.

By using particularly thin piezoelectric strips, their mechanical loading, in particular a mechanical tension, can be reduced. For an efficient deformation of the plate spring it can also be advantageous if the piezoelectric strips are fashioned with a thickness similar to that of the plate spring fashioned as a strip.

As material for the piezoelectric strips, in particular lead-zirconate-titanate (PZT) is suitable. The plate spring can be made of any elastic material, for example metal or glass, preferably silicon or polysilicon or epi-poly. However, the plate spring can also have a combination of elastic materials.

Advantageous specific embodiments and developments result from the subclaims, and from the description with reference to the Figures.

According to a preferred development, at least one slit is fashioned in the plate spring, going continuously from the front side of the plate spring to the rear side of the plate spring. Through such a structuring, or a similar structuring, of the plate spring, the mode spectrum thereof can be optimized, and/or the stress on the plate spring can be minimized.

According to a further preferred development, the plate spring is connected immediately to the frame at least two segments of its front side that are at a distance from one another, in particular at oppositely situated segments of the plate spring. A plate spring clamped at two sides in this manner can have a number of advantages. In particular, a plate spring clamped at two sides can have a significantly higher spring constant, for example higher by a factor of 180, than a plate spring clamped at one side. For this reason, a plate spring clamped at two sides can be made very thin. The thinner the material, the lower can be the stress for the same degree of surface deformation.

"Connected immediately to the frame" and "clamped at two sides" are also intended to include the feature that the plate spring and the frame are made of one and the same material, and for example are structured out from the same substrate. Such a homogenous construction can be advantageous for the distribution of stress to surfaces of the plate spring. In addition, production in this manner can save costs. In the Figures of the drawing, in the following variants are described in which the plate spring is connected to the frame as a separately fashioned layer, and thus "overlaps" it when seen in a top view. However, it is of course the case that the division of a component into "frame" and "plate spring" can also be understood as purely imaginary, for example for the purpose of simpler description. If the plate spring is made so as to be capable of freely oscillating, i.e. it is not connected immediately to the frame, this can have the advantage that at the point of clamping less stress acts on the plate spring. According to a further preferred development, the functional element is a micromirror that has a reflective surface. According to a further preferred development, the functional element can be capable of being displaced in such a way that it is capable of being rotated at least about an axis of rotation. The functional element can have a center reinforcement along the axis of rotation, which can make the component more robust while at the same time having a moment of inertia that is as small as possible. Advantageously, the component is fashioned in such a way that the axis of rotation is situated as close as possible to the reflective surface.

According to a further preferred development, the plate spring is fashioned essentially as a flat cuboid. The axis of rotation is situated parallel to the front side of the plate spring and perpendicular to an edge of the undeformed plate spring, the edge being a longest edge of the cuboid.

According to a further preferred development, the plate spring is essentially fashioned as a flat cuboid. The axis of rotation is situated parallel to an edge of the undeformed plate spring, the edge being a longest edge of the cuboid.

According to a further preferred development, a torsion spring is fashioned between the front side of the plate spring and the mirror element, the torsion spring being connected to the front side of the plate spring, to the mirror element, and to the frame. Instead of or in addition to the torsion spring, a flexible spring can also be provided. Such flexible and/or torsion springs can be situated and fashioned symmetrically or asymmetrically to the axis of rotation, and can have different thicknesses.

According to a further preferred development, the mirror element is connected to the front side of the plate spring via a multiplicity of connecting points at a distance from one another, preferably at least three connecting points at a distance from one another. The connecting points can be base points of a mirror element fashioned as a micromirror. However, they can also be glued points. The mirror element can be connected immediately or indirectly to the front side of the plate spring.

According to a further preferred development, the micromechanical component has a detection device. The detection device includes at least one piezoresistive element. The piezoresistive element is fashioned and situated in such a way that an electrical resistance of the at least one piezoresistive element can be modified through deformation of the plate spring. The detection device further includes printed conductors via which the electrical resistance of the at least one piezoresistive element can be ascertained in order to determine the deformation of the plate spring. Such piezoresistive elements can be free of hysteresis, and enable detection with a clear signal. Advantageously, the piezoresistive elements are fashioned in the plate spring. In this way, the production can be carried out at lower cost, and the measurement can be made more precise.

BRIEF DESCRIPTION OF THE DRAWINGS

In all the Figures, identical or functionally identical elements and devices have been provided with the same reference characters, unless otherwise indicated.

DETAILED DESCRIPTION

Figure 1A:
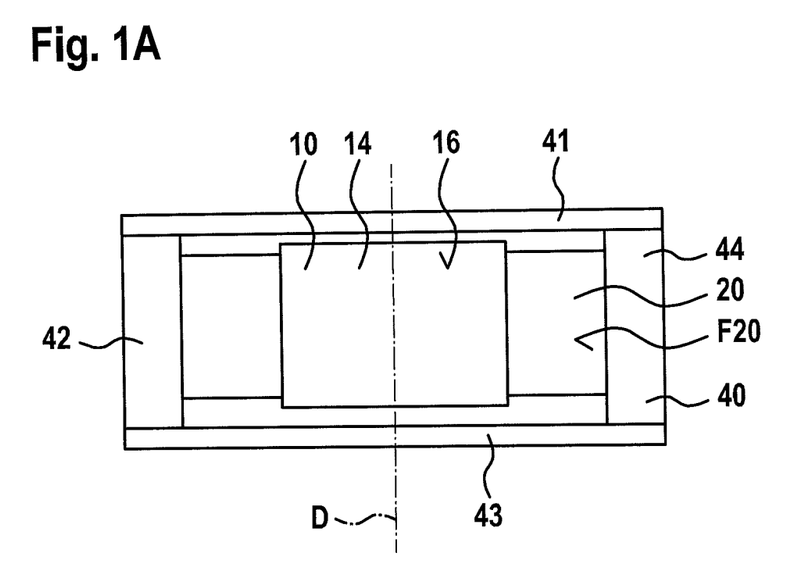
FIGS. 1A-1D show schematic views of a micromechanical component according to a first specific document.

FIG. 1A shows a schematic top view from the front of a micromechanical component according to a first specific embodiment.

The component has a frame 40 that according to FIG. 1A is fashioned as a rectangular frame 40 having four first through fourth partial segments 41, 42, 43, 44 of frame 40. First and third partial segments 41, 43 are situated opposite one another and are fashioned parallel to one another, having the same dimensions. Second and fourth partial segments 42, 44 are also situated in parallel opposite one another and are fashioned essentially with the same dimensions. It is to be noted that frame 40 can also assume any other useful shape, for example an oval shape or a rectangular shape having different dimensions of first through fourth segments 41, 42, 43, 44.

A plate spring 20 is connected to frame 40. The plate spring is fashioned essentially as a rectangular strip, i.e. as a flat cuboid. Plate spring 20 has a front side F20 that is a largest side surface of the cuboid.

According to the first specific embodiment, the micromechanical component has a mirror element 10 fashioned as micromirror 10. Mirror element 10 has a mirror plate 14 having a reflective surface 16. Mirror element 10 is connected to front side F20 of plate spring 20 in such a way that the reflective surface points forward from front side F20 of the plate spring.

Mirror element 10 can be rotated about an axis of rotation D. Axis of rotation D is situated parallel to front side F20 of plate spring 20 inside the region at which mirror element 10 is connected to front side F20 of plate spring 20. Advantageously, axis of rotation D is situated close to reflective surface 16. In addition, axis of rotation D stands perpendicular to a longest edge of plate spring 20. According to the first specific embodiment, a geometrical projection of axis of rotation D onto front side F20 of plate spring 20 is a center perpendicular to a longest edge of front side F20, and is in addition an axis of symmetry of front side F20.

According to the first specific embodiment, reflective surface 16 extends over an entire side surface of mirror plate 14. Mirror plate 14 is fashioned in such a way that a geometric projection of frame 40 onto a plane parallel to front side F20 of plate spring 20 encloses a geometric projection of mirror plate 14 onto the same plane without touching it. The geometric projection of mirror plate 14 onto the plane parallel to front side F20 of plate spring 20 overlaps a geometric projection of plate spring 20 onto the same plane, neither of the two projections completely overlapping the other.

Figure 1B:
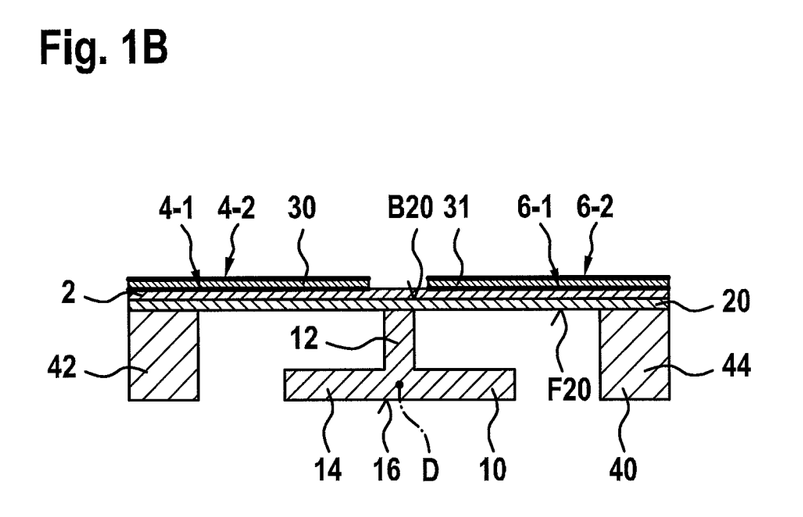

FIG. 1B shows a schematic side view of the micromechanical component according to the first specific embodiment.

According to FIG. 1B, plate spring 20 has a rear side B20 facing away from front side F20. An insulating layer 2, in particular an oxide layer 2, is fashioned on rear side B20 of plate spring 20. A first and a second piezoelectric strip 30, 31 are fashioned on oxide layer 2. Between each piezoelectric strip 30, 31 and oxide layer 2, there are fashioned flat first electrodes 4-1, 6-1, in particular made of metal, for the electrical contacting of a respective piezoelectric strip 30, 31. First electrodes 4-1, 6-1 can for example be fashioned by applying a metal layer onto oxide layer 2 with subsequent structuring of the metal layer. A respective second electrode 4-2, 6-2 is fashioned on each side of first and second piezoelectric strips 30, 31 facing away from first electrode or electrodes 4-1, 6-1. Via a respective first electrode 4-1, 6-1 and respective second electrode 4-2, 6-2, a respective voltage can be applied to a respective piezoelectric strip perpendicular to rear side B20 of plate spring 20. The voltages applied to first and second electrodes 4-1, 4-2, 6-1, 6-2 can be applied via printed conductors (not shown) and can be in particular alternating voltages.

Piezoelectric strips 30, 31 are, at a distance from one another, and each with one of their side surfaces, which is a largest side surface of the respective piezoelectric strip, connected in surface fashion to, respectively, one of the first and one of the second electrodes 4-1, 4-2, 6-1, 6-2. The dimensions of first and second electrodes 4-1, 4-2, 6-1, 6-2 in directions parallel to rear side B20 of the plate spring can in each case be identical to the dimensions of the piezoelectric strip 30, 31 adjoining the respective electrode in this direction. A geometric projection of each of the first and second piezoelectric strips 30, 31 onto a plane parallel to front side F20 of plate spring 20 overlaps in each case the projection of frame 40 onto the same plane.

In addition to mirror plate 14, mirror element 10 also has a spacing element 12 that is connected at a first side of spacing element 12 to front side F20 of plate spring 20, and is connected at a second side of spacing element 12 to mirror plate 14. In this way, spacing element 12 increases a distance between front side F20 of plate spring 20 and reflective surface 16 of mirror plate 14. Spacing element 12 can give mirror plate 14 greater mobility.

Figure 1C:
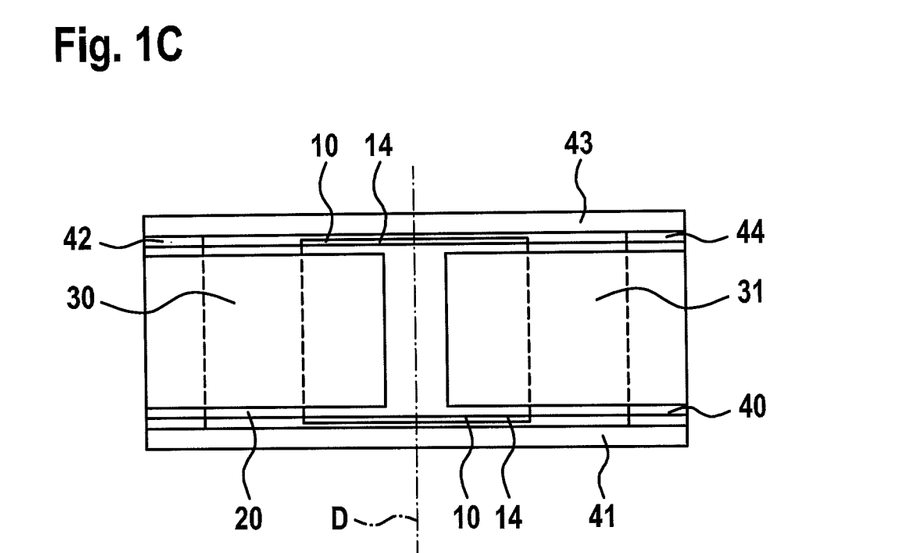

FIG. 1C shows a schematic top view from the rear of the micromechanical component according to the first specific embodiment. According to FIG. 1C, first and second piezoelectric strips 30, 31 are situated on rear side B20 of plate spring 20 so as to be symmetrical relative to axis of rotation D. First and second electrodes 4-1, 6-1, 4-2, 6-2 are not shown for clarity.

Figure 1D:
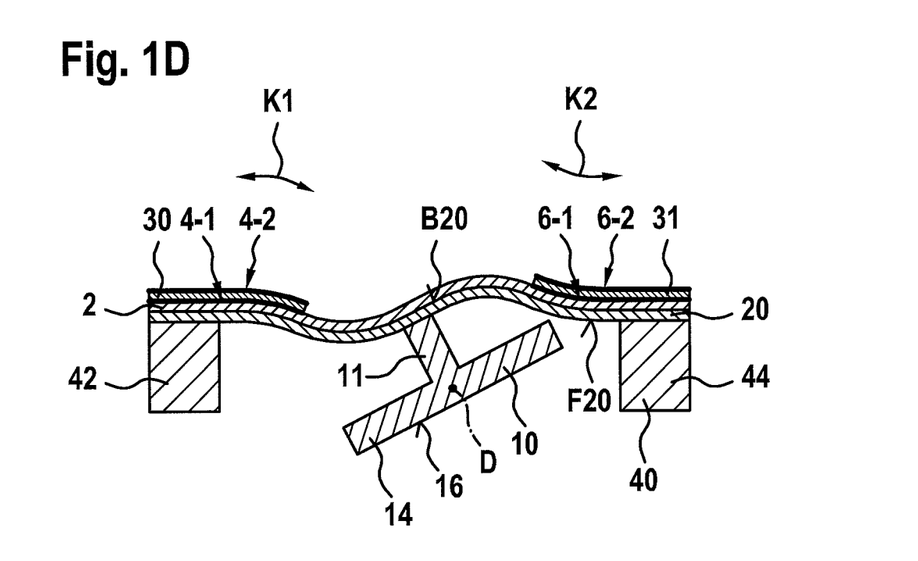

FIG. 1D shows a schematic side view of the micromechanical component according to the first specific embodiment, in a state in which alternating voltages are applied to first and second electrodes 4-1, 6-1, 4-2, 6-2, perpendicular to rear side B20 of plate spring 20.

Due to the expansion and contraction of piezoelectric strips 30, 31, parallel to rear side B20 of plate spring 20 and caused by the alternating voltages, according to a resonant mode of oscillation of plate spring 20, there arise different curvatures K1, K2 at different segments of plate spring 20.

For example, a first curvature K1 can be convex at the segment of plate spring 20 that is situated close to first piezoelectric strip 30, and a second curvature K2, at the segment of plate spring 20 that is situated close to second piezoelectric strip 31, can be concave, or vice versa. According to FIG. 1D, elastically deformed plate spring 20 takes on a deformed shape that can be designated S-shaped in its center, in the area of axis of rotation D. As a result, mirror element 10 is displaced, and in particular is rotated about axis of rotation D. Here, angle of rotation a is also a function of the alternating voltages applied to piezoelectric strips 30, 31. Through the polarity of the voltages applied to piezoelectric strips 30, 31, and their voltage strength, in particular a direction of rotation about axis of rotation D, in FIG. 1D to the left or to the right, and a numerical value of angle of rotation a can be determined Through the targeted controlling of specific modes of oscillation of plate spring 20, however, rotations about a plurality of axes of rotation can also be realized. Plate spring 20 and/or piezoelectric strips 30, 31, as well as the further elements of the micromechanical component, can be fashioned and situated in such a way that such modes of oscillation exist.

According to the first specific embodiment, for piezoelectric strips 30, 31 the fact is exploited that mechanical forces (i.e. piezoelectric forces) can act on piezoelectric elements perpendicular to applied electrical voltages or fields.

Figure 2A:
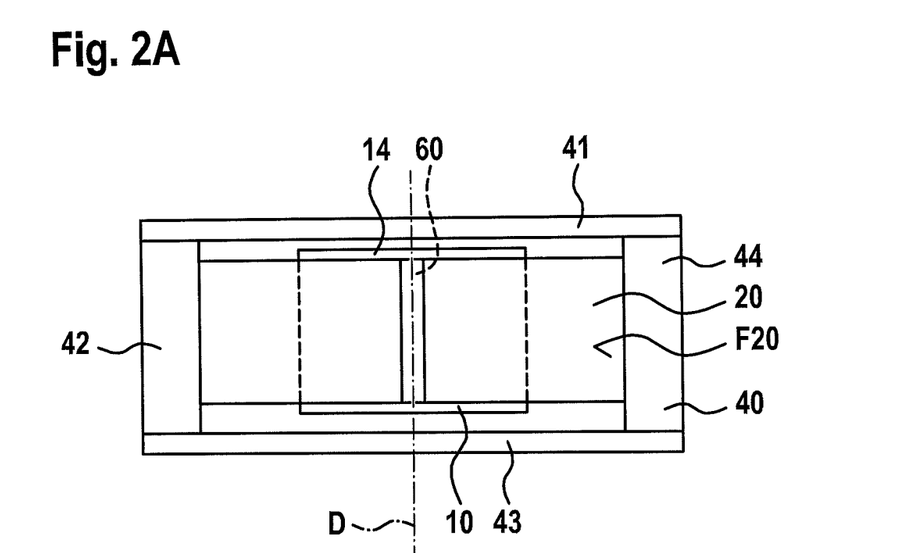
FIGS. 2A-2C schematically show alternatives for the fashioning of connecting points via which the mirror element is fastened to the front side of the plate spring.
Figure 2B:
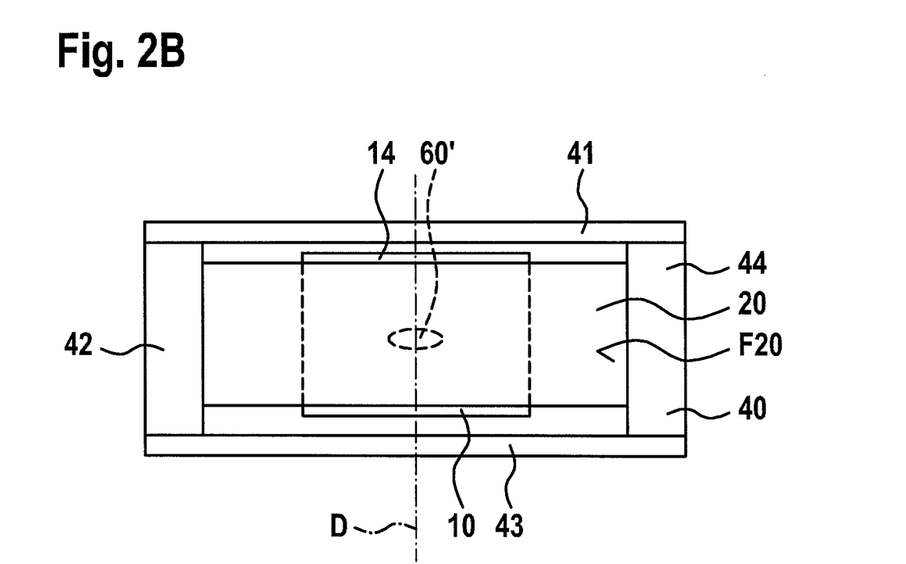

FIGS. 2A through 2C schematically show alternatives for the realization of connecting points 60, 60', 60" via which mirror element 10 can be fastened or connected to front side F20 of plate spring 20. According to FIG. 2A, a first connection point 60 can extend over an entire width of plate spring 20, for example in the form of a rectangular strip. According to FIG. 2D, a second connection point 60', instead of first connection point 60, can be situated with an oval shape and at a center of symmetry of plate spring 20 and/or of a geometric projection of mirror plate 14 onto plate spring 20.

Figure 2C:
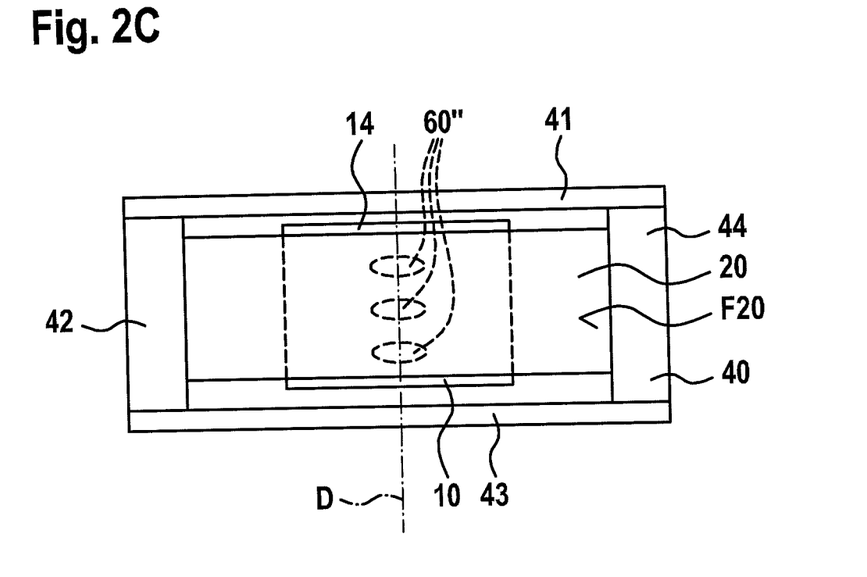

According to FIG. 2C, a multiplicity of third connection points 60" can be fashioned. Third connection points 60" can be situated or fashioned at a distance from one another, having an oval shape, along a geometrical projection of axis of rotation D onto front side F20 of plate spring 20. First and/or second connection point 60, 60' can also be situated along the projection of axis D onto front side F20; the projection can represent an axis of symmetry of connection point 60, 60', 60". It can be provided that the part of mirror element 10, for example spacing element 12, that is connected to front side F20 of plate spring 20 is fashioned in such a way that one of the above-described alternatives of connection points 60, 60', 60" is fashioned. Connection points 60, 60', 60" can each be bonding regions, for example for a connection through eutectic bonding or seal glass bonding. Alternatively, however, an adhesive can also be applied onto front side F20, in the form of the above-described alternatives for connection points 60, 60', 60". In this case, mirror element 10 connected to front side F20 by the adhesive can also have any other shape. In FIG. 2C, first and second electrodes 4-1, 6-1, 4-2, 6-2 are not shown for clarity. Spacing element 12 and/or mirror plate 14 can also be structured monolithically together with the plate spring in such a way that connection points 60, 60', 60" result as described above.

Figure 3A:
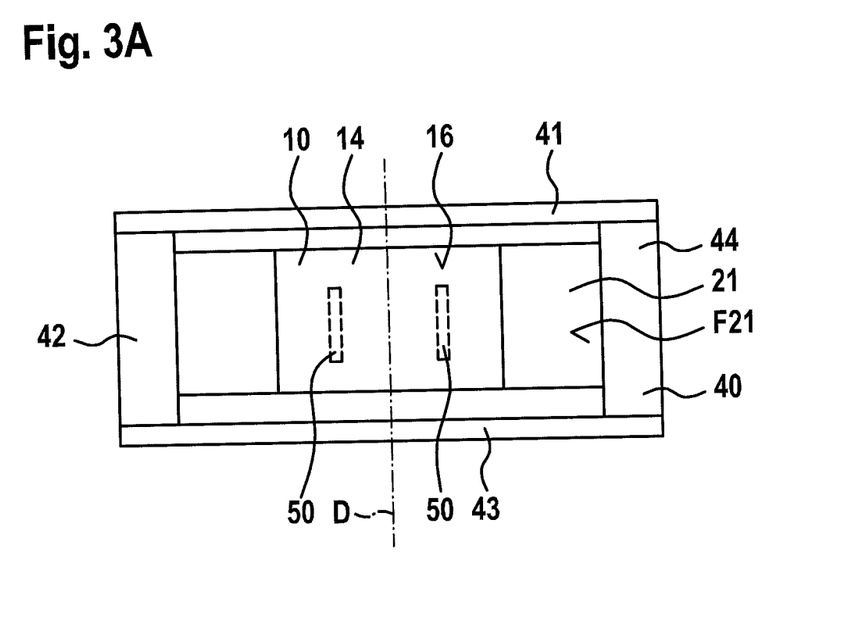
FIGS. 3A-3C show schematic views of a micromechanical component according to a second specific embodiment.
Figure 3B:
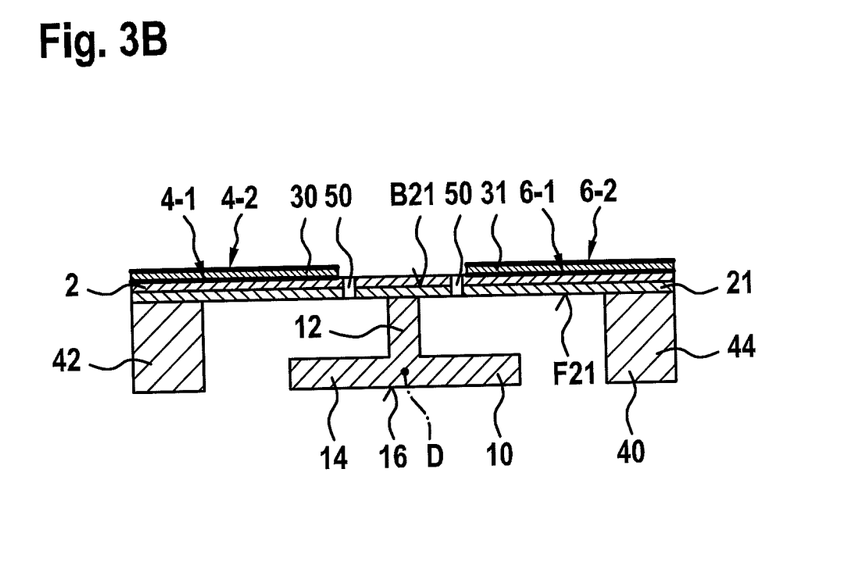
Figure 3C:
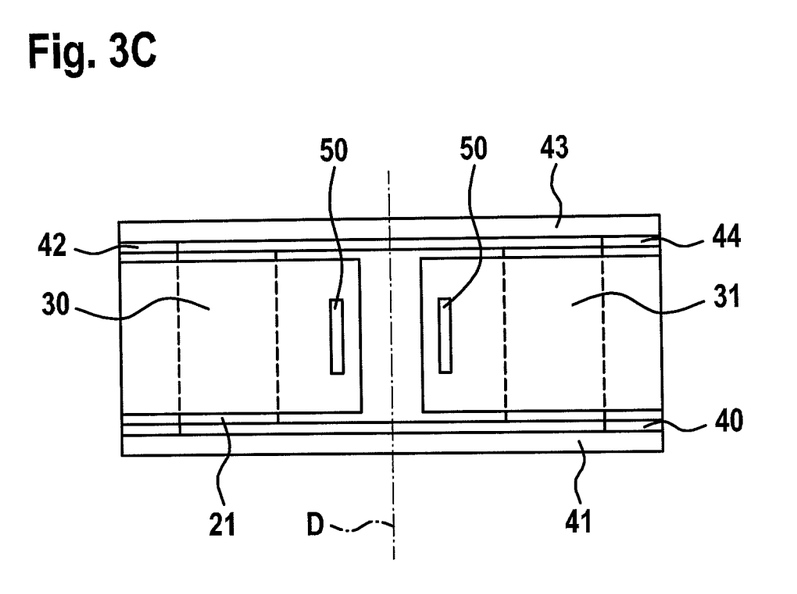

FIG. 3A shows a schematic top view, from the front, of a micromechanical component according to a second specific embodiment. FIG. 3B shows a schematic side view, and FIG. 3C shows a schematic top view from the rear of the micromechanical component according to the second specific embodiment.

According to FIG. 3A, plate spring 21 has, differing from the preceding specific embodiments, two continuous slits 50 going from front side F21 of plate spring 21 to rear side B21 of plate spring 21. Slits 50 are shown in dashed lines, because from the front they would not actually be visible. The two slits 50 are configured symmetrically to a geometric projection of axis of rotation D onto front side F21 of plate spring 21 in the region of plate spring 21 that is not covered by a piezoelectric strip 30, 31. As shown in FIG. 3A, slits 50 can be rectangular openings in plate spring 21, but round openings or differently shaped openings are also possible. Slits 50, or the openings, can minimize the load acting on plate spring 21, or can optimize the mode spectrum of plate spring 21. In particular, stress maxima can be reduced. It is also possible to set the resonance frequency of the plate spring through the fashioning of slits 50 or openings.

For the precise realization of slits, or openings, 50 of plate spring 21, an investigation can be carried out of the mode spectrum of plate spring 21. According to FIG. 3A, plate spring 21 is in addition fashioned in such a way that the geometric projection of mirror plate 14 onto a plane parallel to front side F21 of plate spring 21 is completely covered by a geometric projection of front side F21 onto the same plane. In this way, a more precise rotation of mirror element 10 about axis of rotation D can be enabled. In FIG. 3C, first and second electrodes 4-1, 6-1, 4-2, 6-2 are not shown for clarity.

Figure 4:
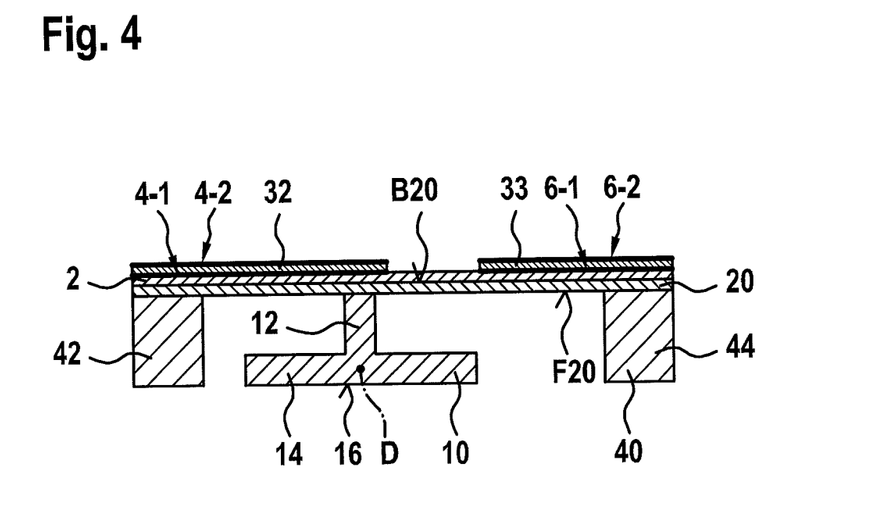
FIG. 4 shows a schematic side view of a micromechanical component according to a third specific embodiment.

FIG. 4 shows a schematic side view of a micromechanical component according to a third specific embodiment.

According to the third specific embodiment, axis of rotation D is not situated so as to coincide with an axis of symmetry of plate spring 20. In particular, axis of rotation D of mirror element 10 is situated in such a way that a geometric projection of axis of rotation D onto a surface parallel to front side F20 of plate spring 20 intersects a geometric projection of first piezoelectric strip 32 onto the same plane. The rotation of mirror element 10 about axis of rotation D can in this way be controlled still more precisely. According to the third specific embodiment, second piezoelectric strip 33, differing from the preceding specific embodiments, is made shorter than first piezoelectric strip 32 in a direction that is perpendicular to axis of rotation D and parallel to the longest edge of plate spring 20.

Figure 5:
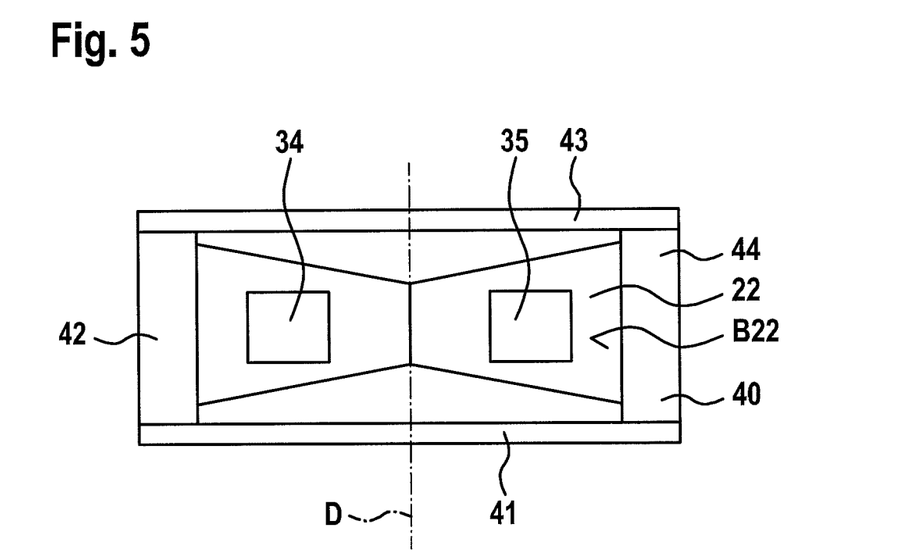
FIG. 5 shows a schematic top view from the rear of a micromechanical component according to a fourth specific embodiment.

FIG. 5 shows a schematic top view from the rear of a micromechanical component according to a fourth specific embodiment.

Differing from the preceding specific embodiments and Figures, plate spring 22 has a modified shape according to FIG. 5. Plate spring 22 has, perpendicular to rear side B22 of plate spring 22, a cross-section that tapers symmetrically toward axis of rotation D in a direction parallel to rear side B22, and symmetrically widens again on the other side of axis of rotation D. The height of the cross-section, corresponding to the thickness of plate spring 22 in a direction perpendicular to rear side B22, need not change here. In the top view from the rear, the shape of rear side B22 of plate spring 22 can be described roughly as hourglass-shaped. In addition, in contrast to the preceding specific embodiments according to FIGS. 1A through 4, piezoelectric strips 34, 35 are fashioned that are smaller with regard to their surface in comparison with the surface of rear side B22 of plate spring 22. In the view from above of the micromechanical component according to FIG. 5, piezoelectric strips 34, 35 overlap neither an edge of plate spring 22 nor frame 40. In FIG. 5, first and second electrodes 4-1, 6-1, 4-2, 6-2 are not shown for clarity.

As in the first and second specific embodiment, piezoelectric strips 34, 35 are situated at a distance from one another on a different side, viewed from axis of rotation D, of rear side B22. The S-shaped deformation of plate spring 22 (cf. FIG. 1D) in the vicinity of axis of rotation D in order to displace mirror element 10 can be facilitated by the situation, according to the fourth specific embodiment, of axis of rotation D in a plane spanned by the cross-section of plate spring 22 having the smallest cross-sectional surface, as well as parallel to rear side B22 of plate spring 22. The structuring of plate spring 22 according to the fourth specific embodiment can in addition be advantageous for the optimization of the form of the movement, the optical beam path, and/or the (interference) modes.

Figure 6A:
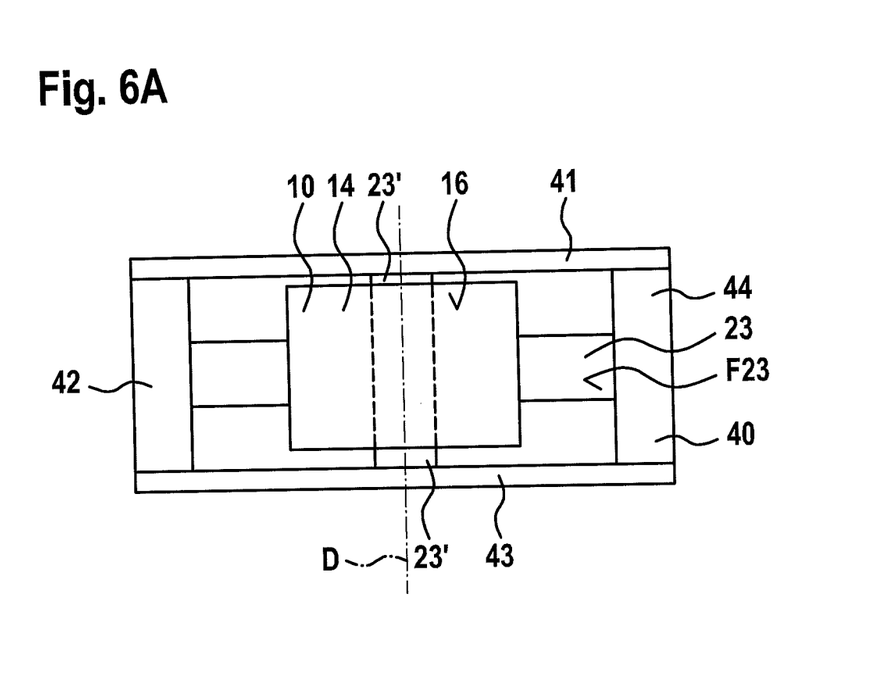
FIGS. 6A-6C show schematic views of a micromechanical component according to a fifth specific embodiment.

FIG. 6A shows a schematic top view from the front of a micromechanical component according to a fifth specific embodiment.

The fifth specific embodiment is essentially a variant of the first specific embodiment; differing from the first specific embodiment, a torsion spring 23' is fashioned between front side F23 of plate spring 23 and mirror element 10, the torsion spring being connected to front side F23 of plate spring 23, to mirror element 10', and to frame 40. According to FIG. 6A, torsion spring 23' is connected to two oppositely situated partial segments 41, 43 of frame 40. Torsion spring 23' is fashioned as an oblong strip whose longitudinal axis is situated parallel to axis of rotation D of mirror element 10. As in the first specific embodiment as well, plate spring 23 is fashioned as an oblong strip. A thickness, i.e. an extension perpendicular to front side F23 of plate spring 23, of both plate spring 23 and of torsion spring 23' can be varied separately from one another in order to further optimize the form of movement and/or the (interference) modes of the component. The geometric projections of axis of rotation D and of the longitudinal axis of torsion spring 23' onto a surface parallel to front side F23 of plate spring 23 are perpendicular to a geometric projection of a longest edge of plate spring 23 onto the same plane.

Figure 6B:
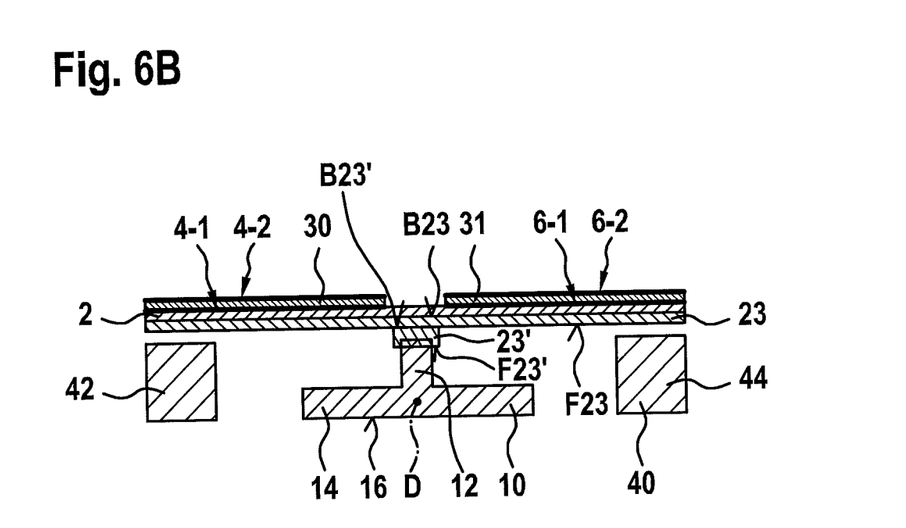

FIG. 6B shows a schematic side view of the micromechanical component according to the fifth specific embodiment.

According to FIG. 6B, torsion spring 23' is connected to front side F23 of plate spring 23 via a rear side B23' of torsion spring 23'. Spacing element 12 of mirror element 10 is connected immediately to a front side F23' of torsion spring 23 that faces away from rear side B23', mirror element 10 being fashioned in a manner analogous to the previous specific embodiments.

According to FIG. 6B, plate spring 23 is connected to frame 40 only indirectly, via torsion spring 23'. Although plate spring 23 is fashioned at a distance from all partial segments 41, 42, 43, 44 of frame 40, in the top view from the front it nonetheless extends past partial segments 42, 44, situated opposite one another, of frame 40.

Figure 6C:
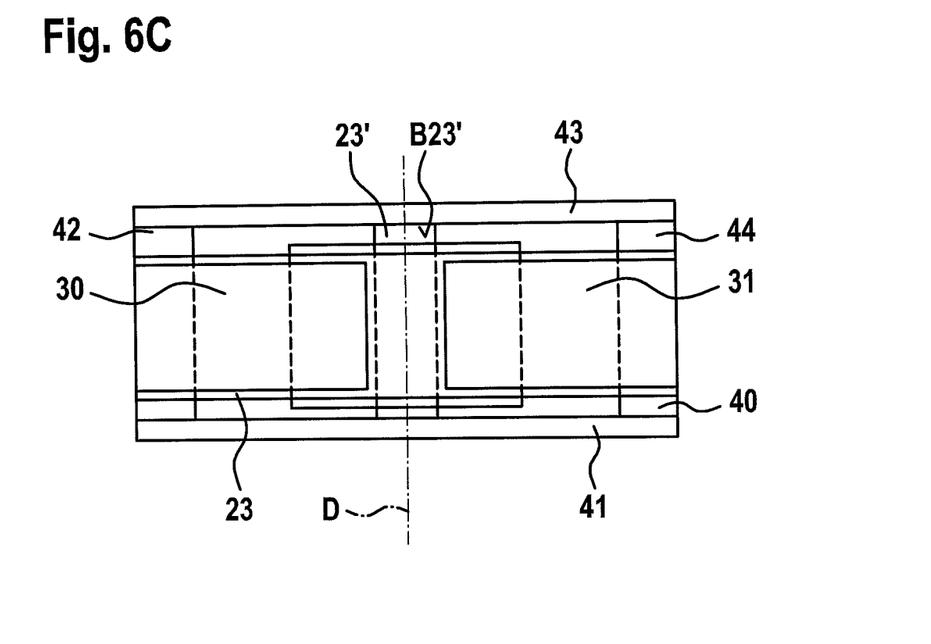

FIG. 6C shows a schematic top view from the rear of the micromechanical component according to the fifth specific embodiment. For clarity, in FIG. 6C first and second electrodes 4-1, 6-1, 4-2, 6-2 are not shown.

Figure 7A:
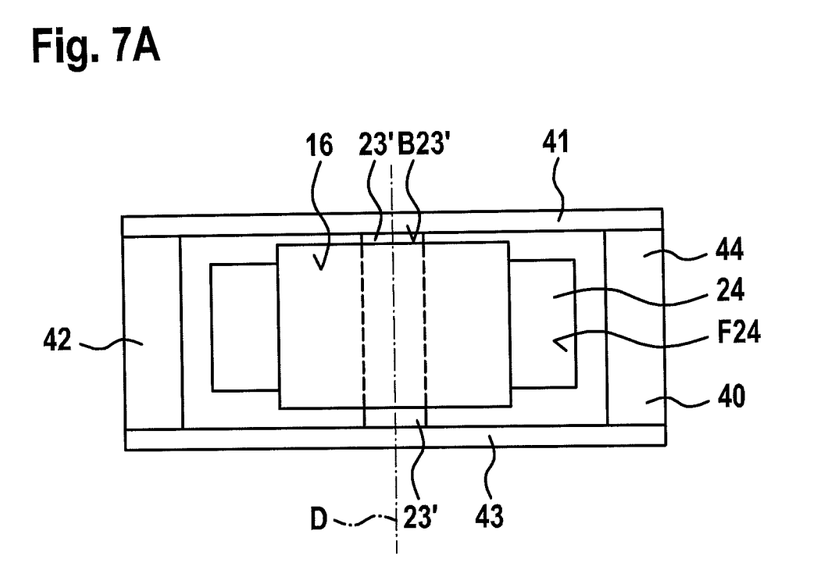
FIGS. 7A-7C show schematic views of a micromechanical component according to a sixth specific embodiment.

FIG. 7A shows a schematic top view from the front of a micromechanical component according to a sixth specific embodiment.

The sixth specific embodiment is a variant of the fifth specific embodiment, wherein, differing from the fifth specific embodiment, plate spring 24 is fashioned comparatively smaller in comparison with frame 40 and in comparison with reflective surface 16 of mirror plate 14. In particular, in the top view of the micromechanical component according to the sixth specific embodiment from the front, front side F24 of plate spring 24 nowhere overlaps frame 40. That is, a geometric projection of frame 40 onto a plane parallel to front side F24 encloses a geometric projection of plate spring 24 onto the same plane without touching it. Thus, plate spring 24 is not clamped at any side, but rather is merely suspended on frame 40 via torsion spring 23'. This specific embodiment can give mirror element 10 a particularly high degree of freedom of movement, so that even strong deflections about axis of rotation D can be possible. In addition, the stress on plate spring 24 is reduced, because it does not have a clamping point and also is not expanded during its deformation. Torsion spring 23' that holds plate spring 24 is advantageously situated in the center of plate spring 24. A further advantageous situation of torsion spring 23', for example at 13% or 87% of an expansion of plate spring 24, is situated in a direction parallel to front side F24 of plate spring 24, and perpendicular to axis of rotation D, where node points of the oscillation modes can be situated.

Figure 7B:
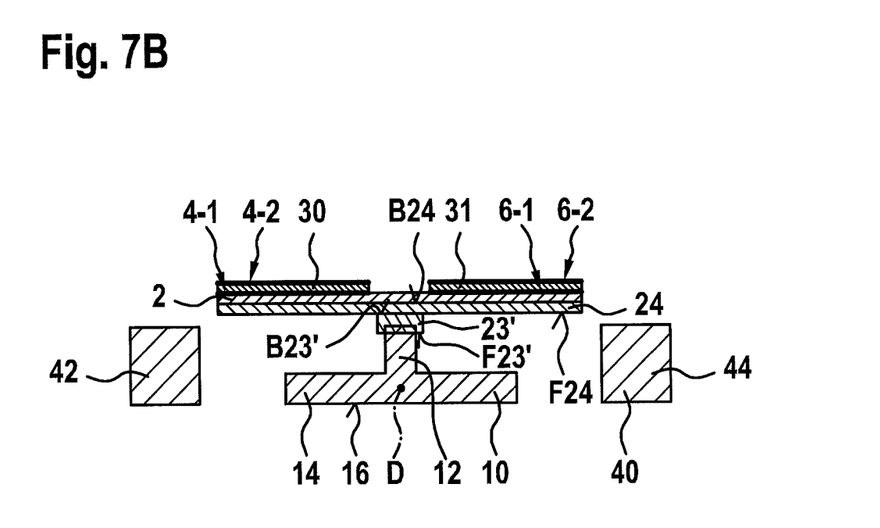
Figure 7C:
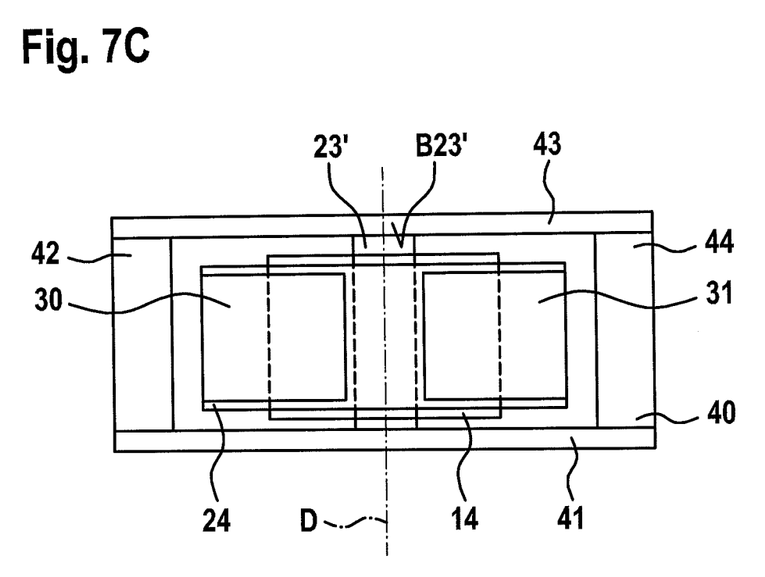

FIG. 7B shows a schematic side view of the micromechanical component according to the sixth specific embodiment. According to the sixth specific embodiment, rear side B23' of torsion spring 23' is connected immediately to front side F24 of plate spring 24. FIG. 7C shows a schematic top view from the rear of the micromechanical component according to the sixth specific embodiment. For clarity, in FIG. 7C first and second electrodes 4-1, 6-1, 4-2, 6-2 are not shown.

Figure 8:
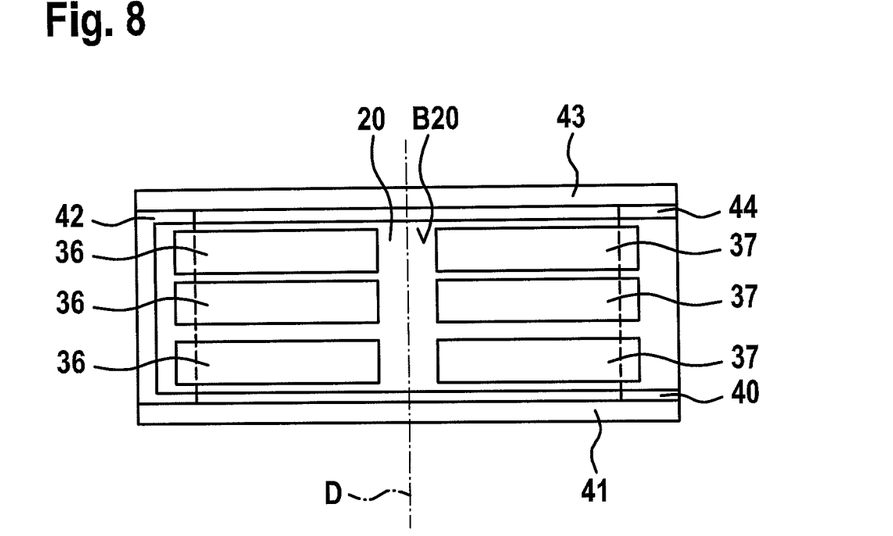
FIG. 8 shows a schematic top view from the rear of a micromechanical component according to a seventh specific embodiment.

FIG. 8 shows a schematic top view from the rear of a micromechanical component according to a seventh specific embodiment.

The seventh specific embodiment is a variant of the first specific embodiment. Differing from the first specific embodiment, in the seventh specific embodiment three first piezoelectric strips 36 and three second piezoelectric strips 37 are fashioned on rear side B20 of plate spring 20. Each piezoelectric strip 36, 37 is situated at a distance from each other piezoelectric strip 36, 37. First and second piezoelectric strips 36, 37 are each fashioned as rectangular strips. First piezoelectric strips 36 are all situated, going out from a geometric projection of axis of rotation D onto rear side B20, on a first side of rear side B20 of plate spring 20. Second piezoelectric strips 37 are all situated on the correspondingly other side of rear side B20. According to the seventh specific embodiment, in the top view of the micromechanical component from the rear all piezoelectric strips 36, 37 partly overlap frame 40. The fashioning of piezoelectric strips 36, 37 at a distance from one another can be advantageous for the optimization of the movement form, the optical beam path, and/or the (interference) modes.

Figure 9:
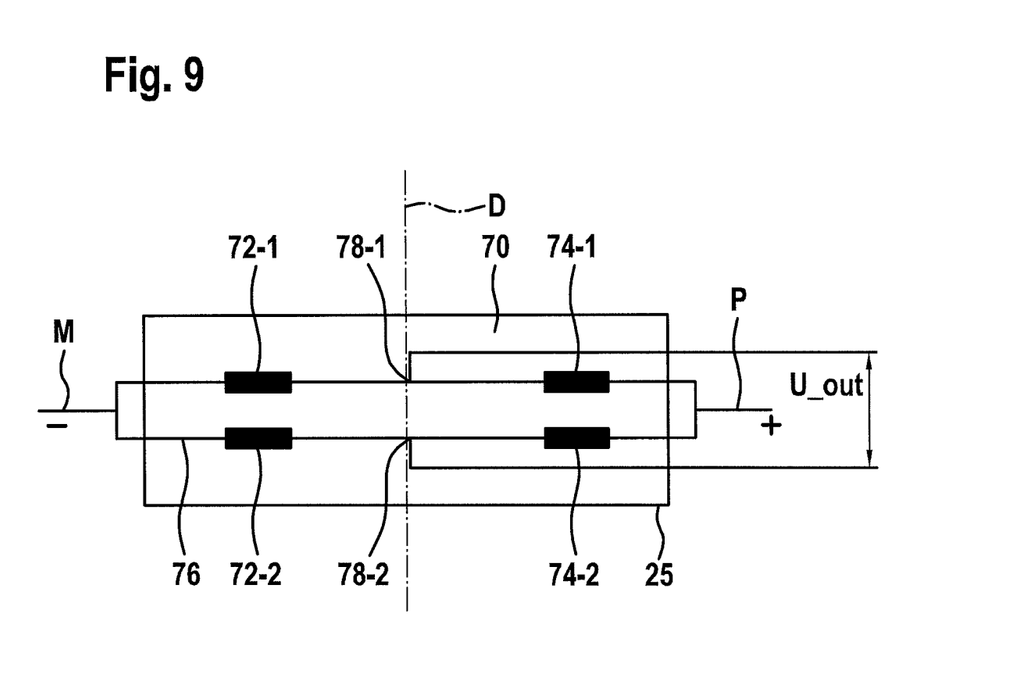
FIG. 9 shows a schematic circuit diagram of a micromechanical component having detection, according to an eighth specific embodiment.

FIG. 9 shows a schematic circuit diagram of a micromechanical component having detection, according to an eighth specific embodiment. According to the eighth specific embodiment, a detection device 70 is provided on the micromechanical component. Information concerning a current deformation of plate spring 25 can be obtained using detection device 70. According to the information thus obtained, the application of the voltage or voltages to the piezoelectric strips can be regulated, so that an alternating current excitation can be applied with a resonance frequency of the plate spring. As is shown schematically in FIG. 9, detection device 70 can advantageously be plate spring 25 itself, in which piezoresistive elements 72-1, 72-2, 74-1, 74-2 are fashioned. For example, piezoresistive elements 72-1, 72-2, 74-1, 74-2 can be diffused into the material of plate spring 25, for example silicon.

According to the eighth specific embodiment, a geometric projection of axis of rotation D onto the undeformed front or rear side of plate spring 25 divides plate string 25 into two equally large halves. Two first piezoresistive elements 72-1, 72-2 are fashioned in or on a first half, defined in this way, of plate spring 25, and two second piezoresistive elements 74-1, 74-2 are fashioned in or on a second half of plate spring 25. First piezoresistive elements 72-1, 72-2 are situated parallel to one another, and second piezoresistive elements 74-1, 74-2 are situated parallel to one another. First and second piezoresistive strips 72-1, 72-2, 74-1, 74-2 are connected by printed conductors 76 to form a Wheatstone bridge.

Via a first electrical pole M to which first piezoresistive elements 72-1, 72-2 are electrically connected, and via a second electrical pole P to which second piezoresistive elements 74-1, 74-2 are electrically connected, a detection voltage can be applied. In the region of axis of rotation D, an output voltage U_out between a first node 78-1 and a second node 78-2 can be picked off and measured. First node 78-1 is electrically connected between one of the first piezoresistive elements 72-1 and one of the second piezoresistive elements 74-1. Second node 78-2 is connected between another of the first piezoresistive elements 72-2 and another of the second piezoresistive elements 74-2.

When there is S-shaped deformation of plate spring 25 (cf. FIG. 1D), first and second piezoresistive elements 72-1, 72-2, 74-1, 74-2 can be differently compressed or stretched. For example, the first half of plate spring 25 can deform concavely and the second half of plate spring 25 can deform convexly, or vice versa. The resulting differences in the electrical resistances of first and second piezoresistive elements 72-1, 72-2, 74-1, 74-2 influence output voltage U_out picked off at the Wheatstone bridge. In accordance with specified parameters, based on output voltage U_out it is possible to infer the current deformation of plate spring 25. Detection device 70 described on the basis of the eighth specific embodiment can also be advantageously used in all other described specific embodiments. The first and second halves of plate spring 25 need not be equally large.

Figure 10:
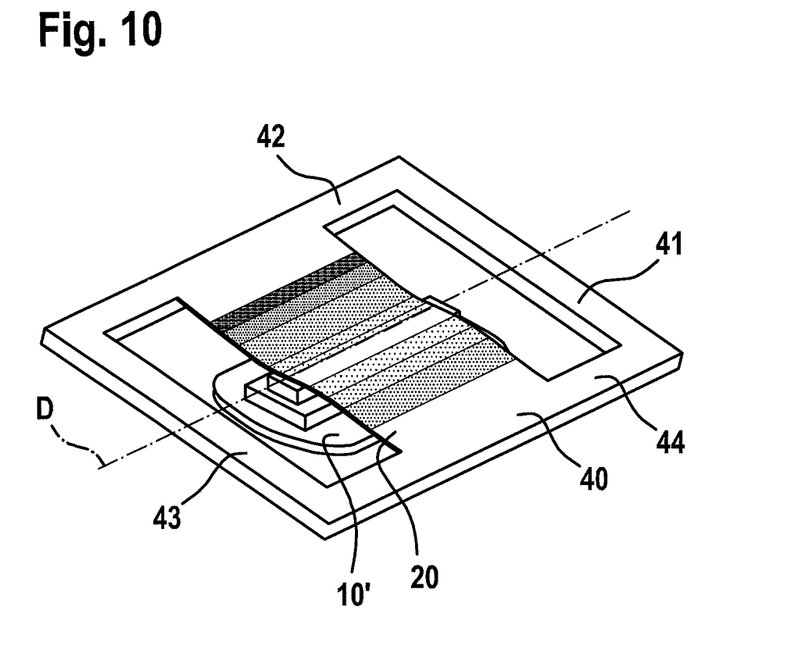
FIG. 10 shows a schematic top view from the rear, at an angle, of a micromechanical component according to a ninth specific embodiment.

FIG. 10 shows a schematic top view from the rear, at an angle, of a micromechanical component according to a ninth specific embodiment, in which plate spring 20 is shown as elastically deformed. Mirror element 10' connected to plate spring 20 is fashioned in a stepped manner in order to optimize the mirror deformation during the deformation of the plate spring, with mirror plate 14 as the broadest step.

Figure 11:
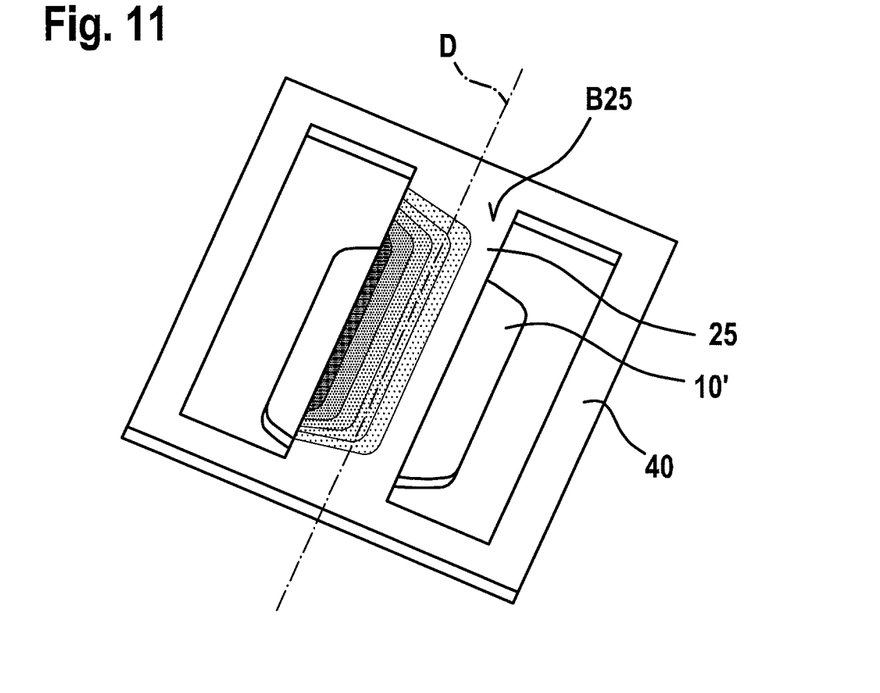
FIG. 11 shows a schematic top view from the rear, at an angle, of a micromechanical component according to a tenth specific embodiment.

FIG. 11 shows a schematic top view from the rear of a micromechanical component according to a tenth specific embodiment.

According to the first through ninth specific embodiments, plate spring 20; 21; 23; 24; 25 is, as described, fashioned essentially as a flat cuboid, axis of rotation D being situated parallel to front side F20; F21; F22; F23; F24 of plate spring 20; 21; 22; 23; 24 and perpendicular to an edge of undeformed plate spring 20; 21; 22; 23; 24, the edge being a longest edge of the cuboid. According to the ninth specific embodiment, plate spring 25 is essentially also fashioned as a flat cuboid. However, axis of rotation D is made parallel to the longest edge of undeformed plate spring 25. In this way, a greater rigidity or spring constant of plate spring 25 can be achieved.

Although the present invention has been described above on the basis of preferred exemplary embodiments, it is not limited thereto, but rather can be modified in various ways. In particular, the present invention can be modified in many ways without departing from the core idea of the present invention.

For example, the plate spring can be fashioned as a continuous membrane, in particular as a thin membrane having a thickness in a range between 0.5 μm and 1.5 μm, which can simplify processing. That is, seen in a top view from the front or from the rear, the plate spring can extend up to the frame and be connected immediately to the frame in all directions parallel to the front side of the plate spring. In this case, it can be particularly advantageous and economical if the frame and the plate spring are structured out from the same substrate, for example by etching.

A trench process for fashioning the frame and/or the plate spring can advantageously take place at the end of the production process, so that the overall structuring of the micromechanical component can take place using photolithographic standard methods from the rear, i.e. via the (later) rear side of the plate spring.

Detection device 70 can for example also be fashioned as an additional detection layer, which can be fashioned for example on front or rear side F20, B20 of plate spring 20, between plate spring 20 and insulating layer 2, or on rear side B20 of insulating layer 20.

What is claimed is:
1. A micromechanical device, comprising:
   a frame;
   a plate spring connected to the frame and having a front side and a rear side facing away from the front side;
   a spacing element;

a mirror element situated on the front side of the plate spring and connected to the front side of the plate spring via the spacing element in such a way that the mirror element is suspended on the frame so as to be capable of displacement, wherein the mirror element includes a reflective surface that is situated at a distance from the front side of the plate spring at least by the spacing element; and at least one piezoelectric strip connected to the rear side of the plate spring, wherein the plate spring is elastically deformable through an application of an electrical voltage to the at least one piezoelectric strip in order to displace the mirror element.

2. The device as recited in claim 1, wherein at least one slit is present in the plate spring continuously from the front side of the plate spring to the rear side of the plate spring.

3. The device as recited in claim 1, wherein the plate spring is connected to the frame at least two segments, at a distance from one another, of the front side of the plate spring.

4. The device as recited in claim 1, wherein the mirror element is displaceable in such a way that the mirror element is capable of rotation at least about an axis of rotation.

5. The device as recited in claim 4, wherein:
the plate spring is formed essentially as a cuboid,
the axis of rotation is situated parallel to the front side of the plate spring and perpendicular to an edge of the plate spring in an undeformed state, and
the edge is a longest edge of the cuboid.

6. The device as recited in claim 4, wherein:
the plate spring is formed essentially as a cuboid,
the axis of rotation is parallel to the rear side of the plate spring and parallel to an edge of the plate spring in an undeformed state, and
the edge is a longest edge of the cuboid.

7. The device as recited in claim 1, further comprising:
a torsion spring between the front side of the plate spring and the mirror element, wherein the torsion spring is connected to the front side of the plate spring, to the mirror element, and to the frame.

8. The device as recited in claim 1, wherein the mirror element is connected to the front side of the plate spring via a plurality of connection points at a distance from one another.

9. The device as recited in claim 1, wherein the mirror element is connected to the front side of the plate spring via at least three connection points at a distance from one another.

10. The device as recited in claim 1, further comprising:
a detection device that includes:
at least one piezoresistive element that is formed and situated in such a way that an electrical resistance of the at least one piezoresistive element can be modified through deformation of the plate spring, and
printed conductors via which the electrical resistance of the at least one piezoresistive element can be ascertained in order to determine a deformation of the plate spring.

11. A method for producing a micromechanical component, comprising:
forming a frame and a plate spring connected to the frame, the plate spring having a front side and a rear side facing away from the front side;
forming a mirror element on the front side of the plate spring that is connected to the front side of the plate spring via a spacing element in such a way that the mirror element is suspended on the frame so as to be capable of displacement, wherein the mirror element includes a reflective surface situated at a distance from the front side of the plate spring at least by the spacing element; and
forming at least one piezoelectric strip that is connected to the rear side of the plate spring in such a way that the plate spring is elastically deformable through an application of an electrical voltage to the at least one piezoelectric strip in order to displace the mirror element.

\* \* \* \* \*